United States Patent [19]
Cavallo

[11] Patent Number: 6,049,950
[45] Date of Patent: Apr. 18, 2000

[54] METHOD AND APPARATUS FOR PROVIDING AN ADJUSTABLE CORD

[76] Inventor: Louis Cavallo, 33 Franklin Rd., Mendham, N.J. 07945

[21] Appl. No.: 09/310,699

[22] Filed: May 7, 1999

[51] Int. Cl.[7] ............................. A44B 21/00; A44B 11/00
[52] U.S. Cl. ..................... 24/68 CD; 24/68 E; 24/69 ST; 24/170; 24/191
[58] Field of Search .............................. 24/68 CD, 68 E, 24/68 T, 71.1, 69 R, 70 ST, 69 ST, 69 CT, 115 M, 134 R, 134 D, 170, 191, 265 CD, 265 EC, 265 BC, 193

[56] References Cited

U.S. PATENT DOCUMENTS

| | | | |
|---|---|---|---|
| 2,442,266 | 5/1948 | Davis | 24/68 CD |
| 2,826,796 | 3/1958 | Davis | 24/170 |
| 3,252,188 | 5/1966 | Davis | 24/68 E |
| 3,253,309 | 5/1966 | Baresch | 24/170 |
| 3,413,691 | 12/1968 | Elsner | 24/170 |
| 3,678,542 | 7/1972 | Prete, Jr. | 24/191 |
| 3,686,715 | 8/1972 | Brodnicki | 24/68 CD |
| 4,373,234 | 2/1983 | Boden | 24/191 X |
| 5,173,996 | 12/1992 | Chou | 24/68 CD |
| 5,423,644 | 6/1995 | First, Sr. | 24/68 CD X |

*Primary Examiner*—James R. Brittain
*Assistant Examiner*—Robert J. Sandy
*Attorney, Agent, or Firm*—Ward & Olivo

[57] ABSTRACT

An adjustable BUNGEE cord device for fastening, securing or mounting objects together or to a stationary object. The device comprises at least two sections of conventional BUNGEE cord, each having a means for attaching the cord sections to each other or to some stationary object, such as metal hooks. One of the cord sections is firmly attached to a locking mechanism via a roll pin positioned near the middle of the locking mechanism. This cord section extends from the locking mechanism through a slot which runs from the roll pin to the edge of the locking mechanism. The other cord section is slidably engaged with the locking mechanism via a slot which extends completely from one end of the locking mechanism to the other. The locking mechanism further comprises a latch hook comprising a lip for securing it in the closed position, a pin hole for rotatably attaching it to the locking mechanism, and a serrated edge for gripping the cord section when the latch hook is in its closed position. To adjust the length, the user merely opens the latch hook, slides the cord section to the desired position, and closes the latch hook.

10 Claims, 4 Drawing Sheets

METHOD AND APPARATUS FOR PROVIDING AN ADJUSTABLE CORD

TECHNICAL FIELD OF THE INVENTION

The present invention generally relates to securing or fastening mechanisms, such as BUNGEE (trademark) cords. More particularly, the present invention relates to adjustable BUNGEE cords for securing or tightening bundles of objects or things (of various shapes and sizes) together.

BACKGROUND OF THE INVENTION

BUNGEE cords are well known and have been used as a fastening means, among other things, for a long time. However, such well known BUNGEE cords have all previously had nonadjustable defined lengths. Although BUNGEE cords are known to be highly elastic (varying with the type of material used), the maximum length to which these cords can be stretched is limited by the elasticity of the BUNGEE cords' material. In other words, prior BUNGEE cords only stretch as much as the material's elasticity will allow, and the cords do not offer any flexibility or adjustability beyond this maximum length. Therefore, these cords cannot be adjusted to, on one occasion, mount or secure an object or objects of a first size and shape, then, on another occasion, mount or secure different objects having a much larger or much smaller size. In the past, multiple cords needed to be "linked" (unsafely) together to accomplish this, and/or many cords having a variety of lengths were needed in order to meet these ever changing length requirements. The present invention has solved this problem with the conventional BUNGEE cords.

Additionally, non-BUNGEE cord extendible fasteners or tools for use in securing or tightening objects or loads, or for mounting things are well known. Examples of such known extendible fasteners are briefly described below. However, these known extendible fasteners or tools are extremely complex industrial devices which are designed for heavy industrial uses. Conversely, the present invention provides a simple, lightweight, adjustable BUNGEE cord fastening means designed for everyday personal and home uses.

The following provides a brief description of the known relevant prior art to the present invention. Patterson et al. U.S. Pat. No. 3,934,855, which issued Jan. 27, 1976, discloses various embodiments of cable fastening apparatus adapted to function as convertible wire rope load binders, container lashings or pullers. These embodiments of the cable fastening apparatus utilize slack take-up devices, such as pullers, which function cooperatively with the body of a wire rope clamp device. These embodiments further employ various types of winch devices.

Stanton U.S. Pat. No. 5,415,451, which issued on May 16, 1995, discloses a mounting system and method which allows standard billboard panels to be mounted to the side wall of commercial vehicles. It has a lower retaining channel and an upper retaining channel forming a track into which billboard panels are inserted and retained.

Kutzleb U.S. Pat. No. 5,482,263, which issued on Jan. 9, 1996, discloses angle adjustable clamps including a pair of jaws connected to plier-type handles. The device disclosed in this patent is useful for gripping and supporting work pieces at a desired angle to each other, and is used to hold two items which are to be joined together at a desired angle.

Suska U.S. Pat. No. 4,607,829, which issued on Aug. 26, 1986, discloses a clamping apparatus utilizing a plurality of C-clamps formed with at least four spaced holes in the frames. This device provides an almost infinite number of holding and clamping positions, thereby permitting work pieces to be orientated in desired arrangements.

Farrell U.S. Pat. No. 5,354,021, which issued on Oct. 11, 1994, discloses an adjustable wiring harness clamp for securing bundles of wires, cables or the like. This device uses a pawl mechanism to engage a loop portion, wherein the desired length can be obtained by adjusting the position of the pawl mechanism on the loop portion.

Eckhart U.S. Pat. No. 5,547,116, which issued on Aug. 20, 1996, discloses a bracket for mounting a carrier on a vehicle. The bracket rigidly supports the carrier at the rear of the vehicle to limit tilting or swaying of the carrier as the vehicle moves. This device utilizes a camming and interlocking arrangement.

Flynn U.S. Pat. No. 4,862,563, which issued on Sep. 5, 1989, discloses a flexible-type securing strap and fastener. The device has a double-sided strip of VELCRO® hook material at one end, and the other end is bifurcated into two sections, each of which have the VELCRO® loop material on the internal surface.

Conley, Jr. U.S. Pat. No. 5,146,859, which issued on Sep. 15, 1992, discloses an adjustable clamp for use in a sewing machine. The device has a plurality of adjustable clamp members which can be adjusted to a predetermined clamp size and which are tightened or loosened by screws to obtain a predetermined clamp size.

Accordingly, the present invention provides a solution to the problems apparent in the prior art. More specifically, the present invention provides adjustability and flexibility to the present well known BUNGEE cord devices. In addition, the present invention provides a simple, lightweight securing device which is easy to manufacture and compact enough for convenient storage and transportation.

SUMMARY OF THE INVENTION

In view of the foregoing disadvantages in the known types of BUNGEE or adjustable tools, the present invention aims to alleviate some of the above disadvantages and provide an adjustable BUNGEE cord apparatus for securing, tightening or mounting a bundle of objects, loads or things. The present invention is designed to meet a plurality of length configurations to fasten such objects, and whose length is simple to adjust—to any desired length.

It is also an object of the present invention to provide an adjustable BUNGEE cord fastening device which is simple and easy to produce as well as lightweight and compact for storage and transportation.

The present invention comprises at least two conventional BUNGEE cords at least one of which is slidably engaged within one of two slots in the locking device. The locking device comprises a hook having a serrated edge for fixing the slidably engaged BUNGEE cord to a specific position. Additionally, each BUNGEE cord comprises a hook or other attachment means at opposite ends of the overall adjustable BUNGEE cord device for securing the device around the objects to be fastened.

Furthermore, the locking device is preferably made of a highly durable material such as steel, metal alloy, etc. Preferably, one BUNGEE cord is locked in a desired position by a hook, while the other BUNGEE cord is fixed in the device by a pin fixedly attached to the end of the cord. Optionally, there can be a plurality of positions wherein the hook with the serrated edge can be locked in order to obtain the desired length of the adjustable BUNGEE cord.

Also, the roll pin located at the base of the hook attaches the hook to the locking device, while the pin at the head of the hook secures (or locks) the hook into the locking device when the head of the hook is pressed down such that the serrated edge of the hook fastens the BUNGEE cord in place. The hook may be "unlocked" by lifting up the head of the hook off the pin at its front, thereby also releasing the BUNGEE cord from its fixed position. The desired length of the adjustable BUNGEE cord fastening device can then be adjusted by sliding the movable BUNGEE cord into or out of the locking device to the desired position. Then, by pressing the head of the hook down into the locking device, the movable BUNGEE cord is again locked into position at the desired length.

An object of the present invention is to provide a length adjustable BUNGEE cord apparatus for securing, tightening or mounting bundles of objects, loads or things, while eliminating the need for having a plurality of fixed length BUNGEE cords to accommodate a variety of size and shape configurations.

A further object of the invention is to provide a low cost adjustable BUNGEE cord fastening device.

Yet another object of the present invention is to provide a lightweight, compact length adjustable BUNGEE cord fastening apparatus which is convenient to carry or store.

An even further object of the present invention is to provide a durable length adjustable apparatus that is long lasting; even when BUNGEE cords are worn out, only BUNGEE cords need to be replaced, not the apparatus itself.

Another object of the present invention is to provide a length adjustable BUNGEE cord fastening apparatus which is simple to adjust without generating any loud noise like other common adjustable tools.

The present invention will be better understood and objects other than those set forth above will become apparent when considered in view of the drawings and detailed description provided below.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which.

DETAILED DESCRIPTION OF INVENTION

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention.

The following presents a detailed description of a preferred embodiment of the present invention. As discussed above, the present invention relates generally to securing or fastening mechanisms, such as BUNGEE cords, and more particularly to adjustable BUNGEE cords for securing or tightening bundles of objects or things together. Specifically, the present invention provides an adjustable BUNGEE cord device for securing object(s) of a first size and shape, and then after a simple adjustment secure object(s) of a second size and shape, with this adjustable BUNGEE cord device comprising two strands or pieces of conventional elastic cord (such as that commonly used in BUNGEE cords) each having an attachment means (e.g., a hook, loop, etc.), and a locking device which "connects" the two elastic cords together in a length adjustable manner. Reference is herein made to the figures, wherein the numerals representing particular parts are consistently used throughout the figures and accompanying discussion.

Figure 1:
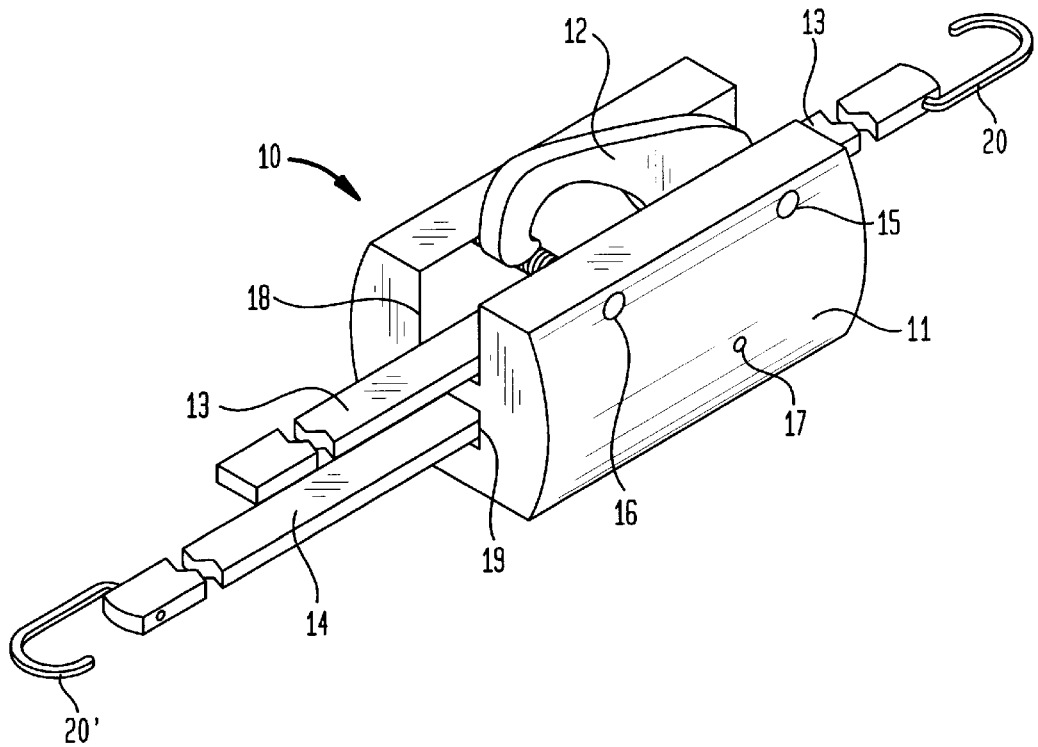
FIG. 1 shows a perspective view of a preferred embodiment of an adjustable BUNGEE cord fastening device according to the present invention.

With reference first to FIG. 1, shown is a perspective view of a preferred embodiment of adjustable BUNGEE cord device 10 in accordance with the present invention. Adjustable BUNGEE cord device 10 comprises locking mechanism 11, and two sections of conventional BUNGEE cord 13,14 (i.e., a strong, durable, elastic material) having hooks 20, 20' (or other attachment means) for affixing device 10 around the object(s) to be secured. Locking mechanism 11 comprises at least two slots 18,19 in which BUNGEE cords 13, 14 are positioned. Cord 13 extends beyond both ends of locking mechanism 11. Slot 18 is open at its top for the entire length of locking mechanism 11. The opening at the top of locking mechanism 11 extends for its entire length in order that latch hook 12 may be positioned lengthwise within slot 18, as shown, to secure cord 13 in place at the desired length. Latch hook 12 is rotatably attached to locking mechanism 11 via roll pin 15 (see also FIG. 3), and has means for securing latch hook 12 in a closed position (roll pin 16 in conjunction with nob or lip 21) and means for gripping cord 13 (serrated edge 22) to secure cord 13 in position at the desired length (both of which are described below in greater detail in reference to FIGS. 3, 4 & 7).

Figure 3:
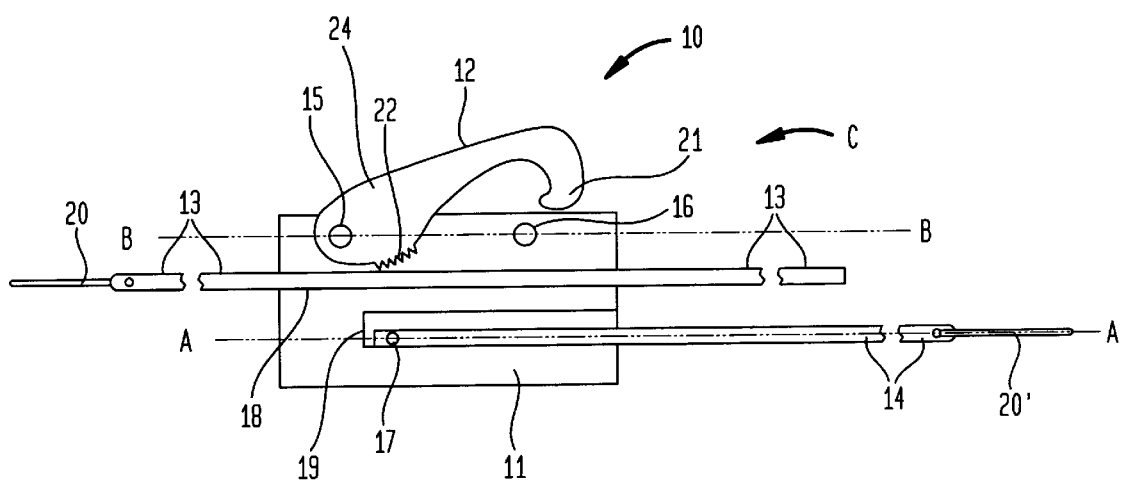
FIG. 3 shows a side cross-sectional view of the adjustable BUNGEE cord fastening device shown in FIG. 1, depicting, in part, the internal connection between the locking device and the BUNGEE cords.
Figure 4:
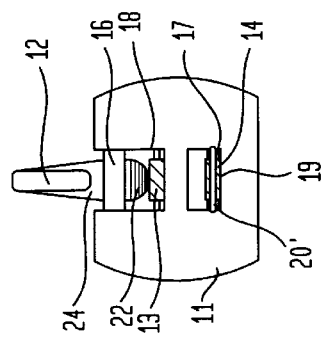
FIG. 4 shows an end view of the locking device shown in FIGS. 2a & 2b.
Figure 7:
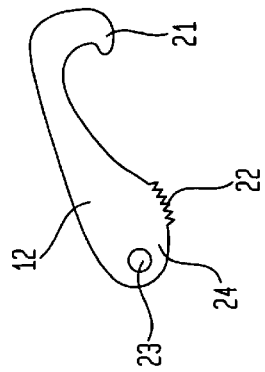
FIG. 7 shows a side view of a preferred embodiment of the hook latch of the locking device according to the present invention, specifically illustrating the serrated edge for securing the BUNGEE cord in position within the locking device.

As shown in FIGS. 3, 4 & 7, latch hook 12 has on its base serrated edge 22 which grips cord 13 when latch hook 12 is in its closed position. Conversely, when latch hook 12 is lifted up and thereby unlatched from pin 16, serrated edge 22 of latch hook 12 is removed from contact with cord 13, thereby releasing cord 13, so it may slide freely within slot 18. When cord 13 is released from serrated edge 22, its position within slot 18 can be adjusted (i.e., shortened or lengthened) to meet the user's desired length of device 10. Also, the end section of cord 13 which extends from slot 18 at the end of locking mechanism 11 nearer to pin 15, as shown, has attachment means 20 (preferably a hook of some sort, but may optionally be a clamp, loop, or some other attachment means) for fastening device 10 around the objects to be secured.

In operation, once the desired position of cord 13 within slot 18 is obtained, cord 13 is "locked" in place by closing latch hook 12 by pushing downward on the head of latch hook 12 until lip 21 (see FIGS. 3 & 7) latches onto pin 16. Serrated edge 22 then contacts cord 13 such that serrated edge 22 grips cord 13 and holds it in position even during application of significant force through stretching of cord 13.

In addition to cord 13, device 10 comprises a second fixed length conventional BUNGEE cord 14 rigidly affixed at one end to locking mechanism 11 within slot 19 by pin 17. The other end of cord 14 extends from slot 19 at the end of locking mechanism 11 nearer to pin 16, as shown, and has attachment means 20 (similar to the attachment means with cord 13, although these do not necessarily need to be the same attachment means) for fastening device 10 around the objects to be secured. Slot 19 is only open on the end of locking mechanism 11 nearer to pin 16, as shown (i.e., slot 19 does not run the entire length of locking mechanism 11, as does slot 18).

In accordance with the preferred embodiment of the present invention, a user wanting to fasten or secure objects using device 10 is merely required to pull cords 13 and 14 in opposite directions around such objects, connect the attachment means 20, 20' firmly to something stationary (or connect the attachment means 20,20' to each other). If device 10 is too short or too long for firmly securing the desired objects, then the user merely opens latch hook 12 thereby releasing cord 13 to slide freely within slot 18, repositions cord 13 to the desired length, and closes latch hook 12 by pressing downward on its head until lip 21 latches onto pin 16. Alternatively, lip 21 of latch hook 12 may comprise a spring-loaded release mechanism whereby the user can easily release latch hook 12 from pin 16 by merely pressing a button.

Figure 2A:
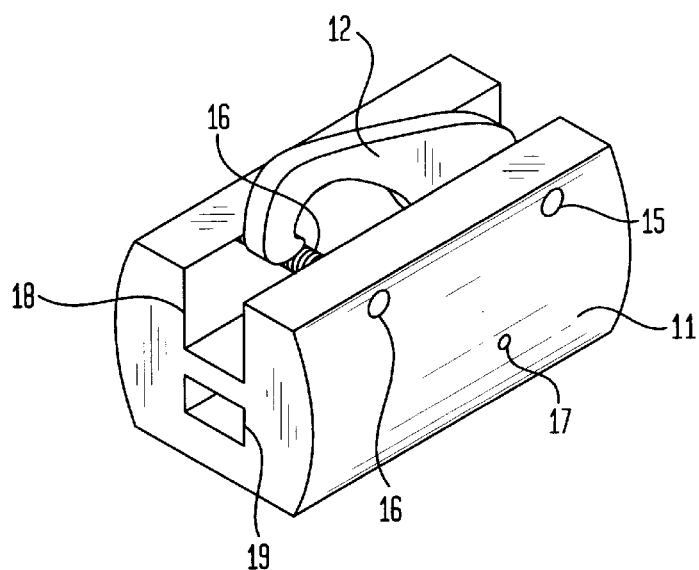
FIG. 2a is a perspective view of a preferred embodiment of the locking device of the present invention showing a first end of said locking device having openings for both slots 18 and 19.
Figure 2B:
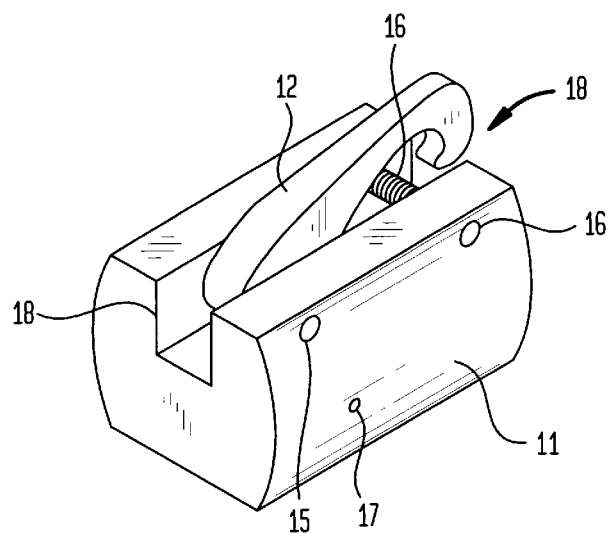
FIG. 2b is a perspective view of a preferred embodiment of the locking device of the present invention showing a second end of said locking device having openings for only slot 18.

Turning next to FIGS. 2a & 2b, depicted are perspective views of a preferred embodiment of locking mechanism 11. As shown in FIG. 2a, locking mechanism comprises slots 18,19, hook 12, and pins 15,16. Preferably, slot 18 is completely open from one end of locking mechanism to the other, while slot 19 is only partially open (i.e., slot 19 is only open at one end of locking mechanism 11). Slots 18,19 are such that cords 13,14 are slidably engaged therewith, respectively. Hook 12, rotates about a roll pin 15 attached at the base of hook 12. Pin 16 is located at the other end of slot 18, and pin 17 is located near the closed end of slot 19. Pins 16 and 17 must be made of strong metal material which can sustain the force of pulling which will be associated with this device. The size of slot 19 is slightly larger than BUNGEE cord 14 so that a BUNGEE cord can be placed therein. The width of slot 18 is approximately the diameter of BUNGEE cord 13. The base of hook 12 is fixed in device 11 by roll pin 15. When the head of hook 12 is lifted up and off pin 16, its position in device 11 is released and therefore, allows the BUNGEE cord to be moved to a desired position. On the other hand, when the head of hook 12 is pushed down onto pin 16, its position on device 11 is locked and the BUNGEE cord 13 in the slot is thus, not removable.

Figure 5:
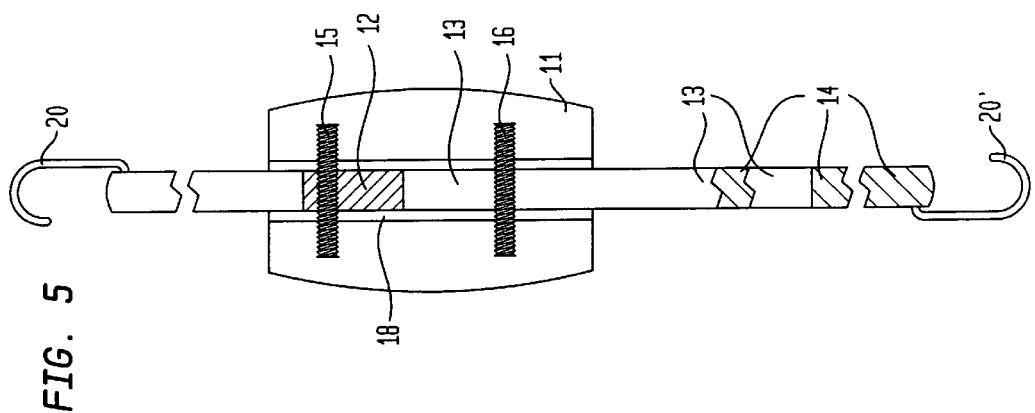
FIG. 5 shows a top cross-sectional view of the adjustable BUNGEE cord fastening device shown at line B—B in FIG. 3.
Figure 6:
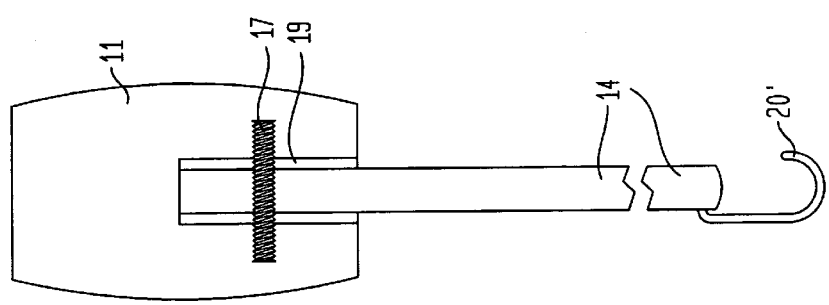
FIG. 6 shows a bottom cross sectional view of the adjustable BUNGEE cord fastening device shown at line A—A in FIG. 3.

In order to understand more completely the function of the invention, FIG. 3 depicts a cross sectional side view, and FIG. 5 shows from above, a preferred emodiment of device 11. A BUNGEE cord 13 is fitted in slot 18 locked in position by a hook 12 with serrated edge 22. The locking mechanism will be described in greater detail later in this description. BUNGEE cord 14 is held in the lower slot 19 by pin 17 (shown in greater detail from below in FIG. 6). The other end of BUNGEE cord 14 is extended to outside of device body 11 and has a common hook 20' on it. Accordingly, as shown in FIG. 3, the hooks of BUNGEE cord 13 and bungee cord 14 are in opposite directions so that when the two BUNGEE cords 13, 14 are fastened in close engagement, their hooks 20 and 20' can be fastened to each other, to other objects or to mount things.

Hook 12(as shown in greater detail in FIG. 7) is fixed in device 11 by roll pin 15 inserted into hole 23 by its base 24. Base 24 of hook 12 has serrated edge 22 which can grip BUNGEE cord 13 when hook 12 is in locked position. When the head 21 of hook 12 of device body 21 is "lifted up" and is off pin 16, the BUNGEE cord 13 is released from locked position and therefore, the BUNGEE becomes adjustable. To obtain the desired length of BUNGEE cord, simply adjust the position of BUNGEE cord 13 in the slot 18. Once the BUNGEE cord 13 is adjusted to the desired length, pushing down head 21 of hook 12, locks hook 12 in device 11 by pin 16 and thereby the serrated edge 22 of hook 12 grips and holds the position of bungee cord 13 at a desired length.

The position of roll pin 15 in slot 18 must be high enough to place BUNGEE cord 13 and hook 12 in slot 18. More importantly, the position of pin 15 in slot 18 must be exact so that when hook head 21 is pressed down onto pin 16, serrated edge 22 can securely grip BUNGEE cord 13 and will not allow the position of BUNGEE cord 13 to be loosened. When head 21 of hook 12 is pressed down onto pin 16, no space in between serrated edge 22 and BUNGEE cord 13 is allowed. On the other hand, the position of pin 15 in slot 18 must not be too low so that BUNGEE cord 13 can not be placed in slot 18 or when head 21 of hook 12 is off the pin 16, the position of BUNGEE cord 13 can not be adjusted in slot 18. The position of pin 16 in slot 18 must also be accurate so that when head 21 of hook 12 is pressed down, it can grab onto pin 16 meanwhile its serrated edge 22 is exactly pressing on BUNGEE cord 13. If the position of pin 16 is too low or too high, the serrated edge 22 of hook 12 will not be able to grip BUNGEE cord 13 when head 21 of hook 12 is pressed down onto pin 16; thus, the position of BUNGEE cord 13 cannot be locked in slot 18.

An additional view of the device 11 from the end closest to hook 20' is shown in FIG. 4. Slot 19 is showed which contains BUNGEE cord 14 secured by pin 17 to the device 11. The size of slot 19 is slightly bigger than BUNGEE cord 14 in order to allow free movement of the BUNGEE when the Hook 12 is not in the locked position, while also providing the frictional constraint on the cord which is required when the device is in the locked position. The hook 12 is held in device body 11 by pin 15. Base 24 of Hook 12 is fixed in device 11 by inserting roll pin 15 into hole 23 of hook 12 so that head 21 of hook 12 can be rotated.

While the present invention has been described with reference to one or more preferred embodiments, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the adjustable BUNGEE cord fastening device of the present invention is capable of being embodied in other forms without departing from its essential characteristics.

What is claimed is:

1. An adjustable cord device for securing objects or things in close engagement, said adjustable cord device comprising:
   at least two cords of predetermined lengths each having an attachment means at one end for fastening the device around the object to be secured;
   at least one length adjustment device comprising:
      a base having a first and a second slot;
      a hook having a top and a bottom for adjustably securing one of said cords; and
      at least three pins, wherein one of said pins affixes one of said cords to said base within said first slot, wherein another of said pins rotatably attaches said bottom of said hook to said base within said second slot, and wherein another of said pins secure said top of said hook in a closed position to secure movement of said cord in said second slot;
   wherein said cord in said second slot is adjustable within said base when said top of said hook is opened; wherein said cord in said second slot is fixed in position when said hook is closed; and wherein said cord in said first slot if affixed to said base.

2. An apparatus according to claim 1, wherein said hook comprises serrated teeth for gripping said cord in said second slot when said hook is closed.

3. An adjustable cord device according to claim 1, wherein said cords are elastic cords.

4. An adjustable cord device according to claim 1, wherein said attachment means are metal hooks.

5. An adjustable cord device according to claim 1, wherein said attachment means are loops.

6. An apparatus for providing an adjustable cord, said apparatus comprising;
   a base member comprising first and second channels, first, second and third pins, and a latch hook;
   a first cord positioned within said first channel and fastened to said base by said first pin; and
   a second cord slidably engaged with said second channel;
   wherein said first and second cords each comprise an attachment means on at least one end thereof for fastening the device around objects to be secured;
   wherein said latch hook is rotatably affixed to said base within said second channel by said second pin; and
   wherein said latch hook attaches to said third pin to secure said second cord within said second channel.

7. An apparatus according to claim 6, wherein said latch hook comprises serrated teeth for gripping said second cord within said second channel when said latch hook is attached to said third pin.

8. An adjustable cord device according to claim 6, wherein said cords are elastic cords.

9. An adjustable cord device according to claim 6, wherein said attachment means are metal hooks.

10. An adjustable cord device according to claim 6, wherein said attachment means are loops.

* * * * *